US008510610B2

(12) United States Patent
Chu et al.

(10) Patent No.: US 8,510,610 B2
(45) Date of Patent: Aug. 13, 2013

(54) METHOD AND SYSTEM OF COMPRESSING RAW FABRICATION DATA FOR FAULT DETERMINATION

(75) Inventors: Yij Chieh Chu, New Taipei (TW); Yun-Zong Tian, Taichung (TW)

(73) Assignee: Inotera Memories, Inc., Taoyuan County (TW)

( * ) Notice: Subject to any disclaimer, the term of this patent is extended or adjusted under 35 U.S.C. 154(b) by 182 days.

(21) Appl. No.: 13/240,305

(22) Filed: Sep. 22, 2011

(65) Prior Publication Data

US 2012/0331357 A1  Dec. 27, 2012

(30) Foreign Application Priority Data

Jun. 22, 2011  (TW) .............................. 100121812 A

(51) Int. Cl.
*G06F 11/00* (2006.01)
(52) U.S. Cl.
USPC .......................................... 714/708; 700/121
(58) Field of Classification Search
USPC ................ 702/182; 216/59; 703/2; 700/83, 700/108, 121; 714/708
See application file for complete search history.

(56) References Cited

U.S. PATENT DOCUMENTS

| 6,582,618 | B1 * | 6/2003 | Toprac et al. | 216/59 |
| 6,675,137 | B1 * | 1/2004 | Toprac et al. | 703/2 |
| 6,789,052 | B1 * | 9/2004 | Toprac | 703/2 |
| 6,980,873 | B2 * | 12/2005 | Shen | 700/108 |
| 7,324,855 | B2 * | 1/2008 | Ushiku et al. | 700/83 |
| 7,395,131 | B2 * | 7/2008 | Funk | 700/108 |
| 7,477,960 | B2 * | 1/2009 | Willis et al. | 700/121 |
| 7,529,642 | B2 * | 5/2009 | Raymond | 702/182 |

* cited by examiner

*Primary Examiner* — David Ton
(74) *Attorney, Agent, or Firm* — Rosenberg, Klein & Lee

(57) ABSTRACT

The instant disclosure relates to a raw data compression method for the fabrication process. The method includes the steps of: inputting into a signal converter a collection of raw data points representing operational parameter of a semiconductor equipment within a predetermined time period; obtaining an approximation of the raw data points with a Fourier series; computing the Fourier coefficients and the residuals between the raw data points and the corresponding predicted values predicted by the Fourier series; determining if the residuals exceed an error threshold; recording and storing the Fourier coefficients as the compressed data if none of the residuals exceeds the error threshold; and recording the raw data point as abnormal data point if the corresponding residual exceeds the error threshold before recording and storing the Fourier coefficients and the abnormal data point as the compressed data.

10 Claims, 9 Drawing Sheets

METHOD AND SYSTEM OF COMPRESSING RAW FABRICATION DATA FOR FAULT DETERMINATION

BACKGROUND OF THE INVENTION

1. Field of the Invention

The instant disclosure relates to a method of fault determination by analyzing compressed raw fabrication data representing an operating parameter of a semiconductor fabrication process; more particularly, to a method and system of compressing raw fabrication data having high compression ratio and low distortion rate that represents operation parameters of a semiconductor fabrication process for fault determination.

2. Description of Related Art

To maintain manufacturing competitiveness, semiconductor manufacturers must seek reduction of its production cost by approximately 25~30% annually. To enhance equipment efficiency and lower production cost, companies such as AMD, IBM, INTEL, and SEMATECH have been researching on topics such as in factory control, integrated metrology, and automated monitoring system. In particular, the control theory of Advance Process Control, or APC, is especially favored by the semiconductor industry. One of the process control tools of the APC is fault detection and classification (FDC). The FDC helps to minimize unscheduled downtime and detect equipment issues more quickly to reduce scrap, thereby ensuring the product quality. Started at research level, the FDC process has been applied widely in industrial practices.

However, the FDC process often requires the recordation of an excessive amount of data, which in turn takes a long time to download and analyze. The long waiting time is not effective in providing real-time monitoring and improving fabrication parameters efficiently, besides wasting time and labor. The large amount of data also makes data analyzing more difficult.

To address the above issues, the inventors strive via industrial experience and academic research to provide the instant disclosure, which can effectively improve the limitations described above.

SUMMARY OF THE INVENTION

The instant disclosure is to provide a method of compressing raw data representing operational parameters of a semiconductor fabrication process for fault determination. The method replaces large amount of raw data with small amount of compressed data, with high compression ratio and low distortion rate.

The method of compressing raw fabrication data of the semiconductor fabrication process comprises the following steps: inputting into a signal converter a collection of raw data points within a predetermined time period; obtaining an approximation of the raw data points with a Fourier series by the signal converter; computing the Fourier coefficients and the differences (residuals) between each of the raw data points and the corresponding predicted values by the Fourier series; determining if the residuals exceed an error threshold; recording and storing in a data storage device the Fourier coefficients as the compressed data if none of the residuals exceeds the error threshold; and recording in the data storage device the raw data point as abnormal data point if the corresponding residual exceeds the error threshold before recording and storing the Fourier coefficients and the abnormal data point as the compressed data.

For advantages, the instant disclosure uses a small amount of compressed data points to accurately approximate the raw data points by fitting the large amount of raw data points with the Fourier series. In addition, the compressed data points can be downloaded and analyzed in less time, allowing the end user to achieve real-time monitoring and adjust the fabrication parameters in a timely manner. Thus, more time and labor can be saved effectively.

In order to further appreciate the characteristics and technical contents of the instant disclosure, references are hereunder made to the detailed descriptions and appended drawings in connection with the instant disclosure. However, the appended drawings are merely shown for exemplary purposes, rather than being used to restrict the scope of the instant disclosure.

DETAILED DESCRIPTION OF PREFERRED EMBODIMENTS

The instant disclosure provides a method of compressing raw fabrication data, which is applicable to any production process. The fabrication process of semiconductors is used for the instant embodiment.

The semiconductor fabrication process involves the use of semiconductor equipments. When a batch of wafers is specially processed, the fabrication parameters (e.g. temperature, humidity, RPM) of each semiconductor equipment would vary with time. The changes of equipment parameters with respect to time are detected and recorded by a Fault Detection and Classification (FDC) system D2.

For each semiconductor equipment, every equipment parameter can vary within its own preconfigured limits. After a batch of wafers is specially processed by the semiconductor equipment, a large number of raw fabrication data points are detected by the FDC system D2 within a specified time. When the end user wishes to analyze the data, fast downloading and analyzing time are preferred. The data compression method of the instant disclosure uses a waveform function of compressed data points to accurately approximate the pattern of the raw data points.

Figure 1A:
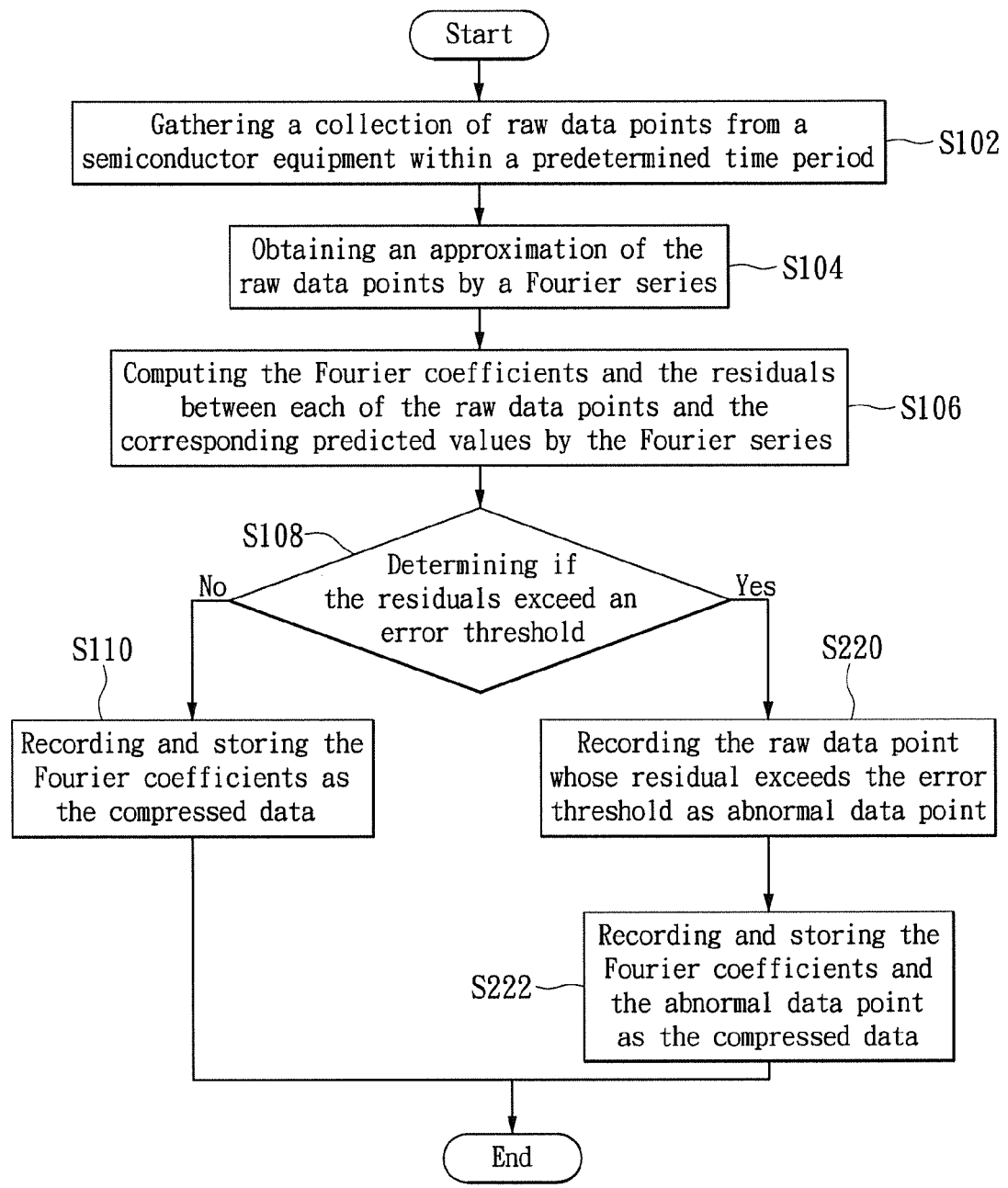
FIG. 1A is a flowchart showing the steps of a data compression method of the instant disclosure.

As shown in FIG. 1A, the method of compressing raw fabrication data of the instant disclosure, for using with semiconductor equipments, comprises the steps of S102, S104, S106, S108, S110, S220, and S222.

Figure 2:
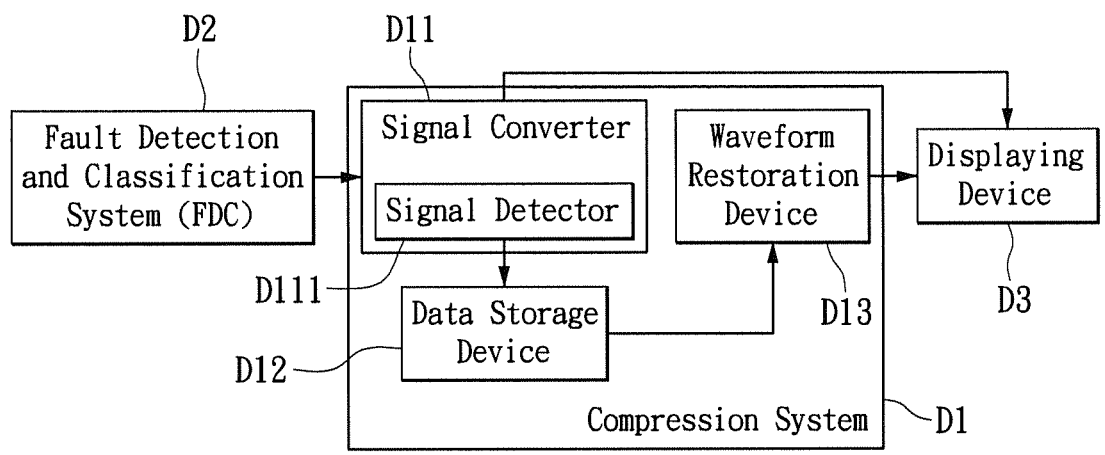
FIG. 2 is a block diagram showing a data compression system of the instant disclosure.
Figure 3A:
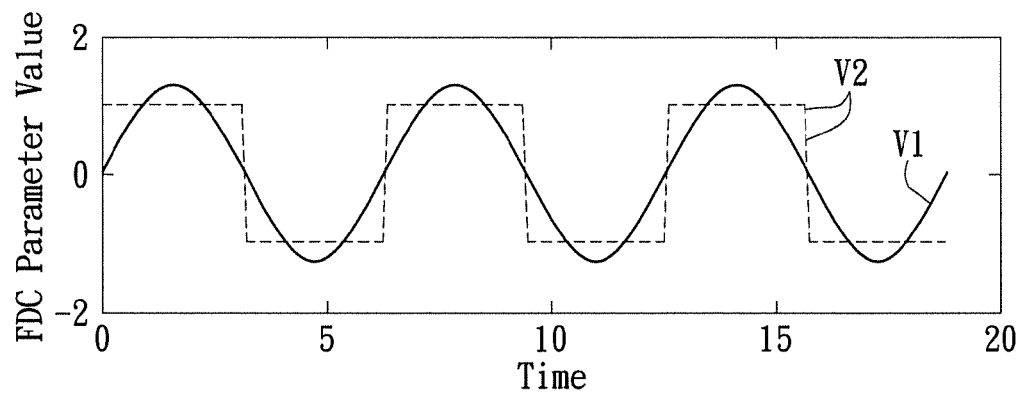
FIG. 3A is a plot showing a Fourier series approximation for a square wave of the instant disclosure.
Figure 3B:
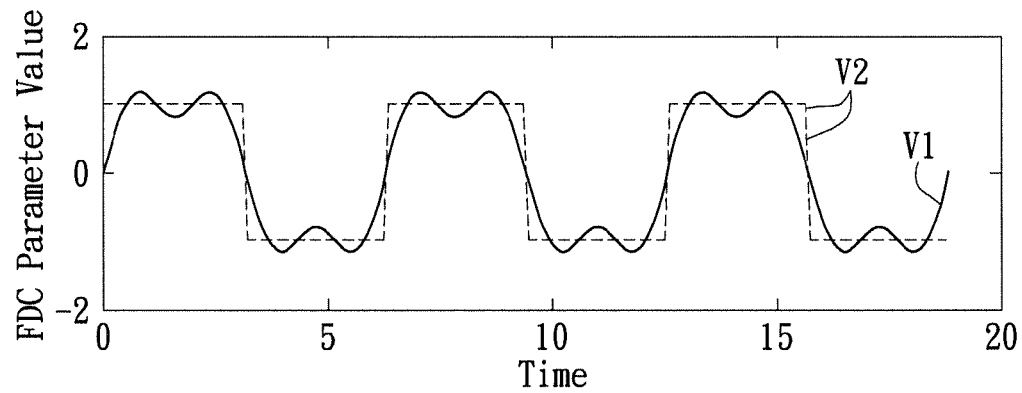
FIG. 3B is a plot showing another Fourier series approximation for the square wave of the instant disclosure.
Figure 3C:
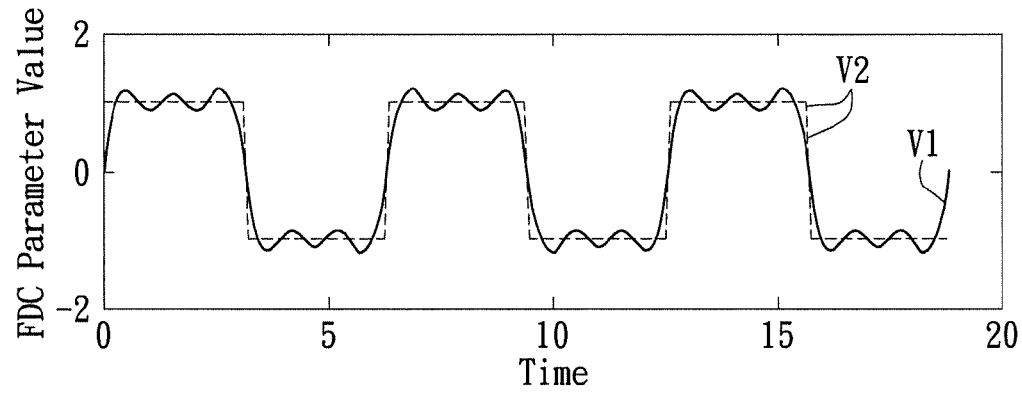
FIG. 3C is a plot showing still another Fourier series approximation for the square wave of the instant disclosure.
Figure 4:
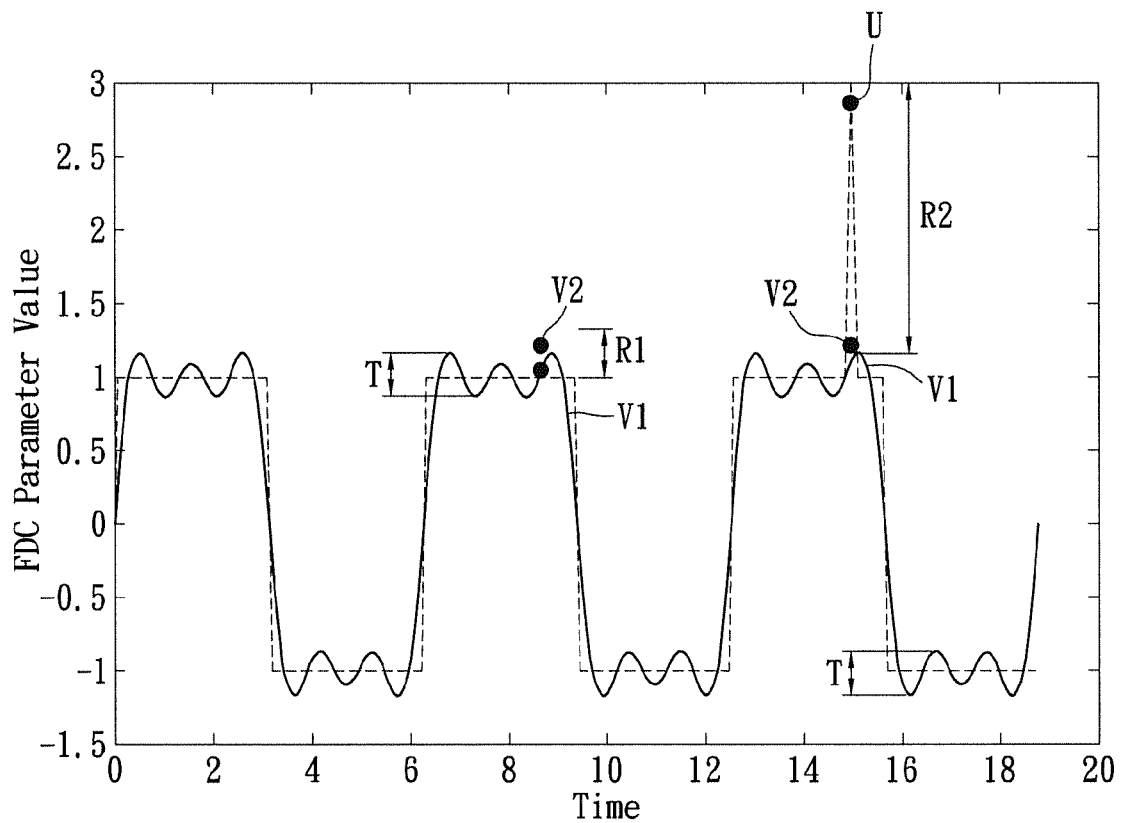
FIG. 4 is a plot showing the identification of the abnormal data point.

Please also refer to FIGS. 2, 3A~3C, and 4 in conjunction with FIG. 1A. FIG. 1A is a flowchart showing the steps of the data compression method of the instant disclosure, FIG. 2 is a block diagram showing a data compression system of the instant disclosure, FIGS. 3A~3C show various modeling curves of the instant disclosure, and FIG. 4 is a plot showing the raw data points being checked against abnormality. Please note, FIGS. 3A~3C are best-case scenario embodiments, which are used to clearly and concisely explain how the data compression method of the instant disclosure compresses large amounts of raw data points into small amounts of compressed data points. The more real case scenarios are illustrated in FIGS. 5A~5G, which will be explained later.

As shown in FIGS. 1A and 2, the data compression method of the instant disclosure first requires inputting into a signal converter D11 a collection of raw data points in a predetermined time period (step S102). The raw data points belong to various operational parameters of the semiconductor equipment. Next, as shown in FIGS. 3A~3C, the raw data points V2 represented by the square waves may be expressed in terms of a Fourier series V1 by the signal converter D11 (step S104). Then, the Fourier coefficients of the Fourier series V1 and the differences (residuals) between the raw data points V2 and the corresponding predicted values by the Fourier series V1 are computed (step S106). Then, as shown in FIGS. 2 and 4, the residuals are determined if exceeding an error threshold T (step S108). If none of the residuals exceeds the error threshold T, the corresponding Fourier coefficients are recorded and stored as the compressed data in a data storage device D12 (step S110). Conversely, if the corresponding residual exceeds the threshold T, the raw data point V2 is recorded as abnormal data point U (step S220) before recording and storing the Fourier coefficients and the abnormal data point U as compressed data in the data storage device D12 (step S222).

The method of compressing raw fabrication data of the instant disclosure uses Fourier series V1 to approximate the raw data points V2. The obtained compressed data points are used to replace the raw data points V2. By significantly reducing the amount of stored data, the end user can finish data downloading and processing in less time. Each step of the data compression method of the instant disclosure is described in details hereinbelow:

[Step S102]

Please refer to FIGS. 1B, 2, and 3A~3C. First, the raw data points V2 detected by the FDC system D2 is collected. The FDC system D2 is disposed on a fault detection equipment (not shown), to monitor and detect a collection of fabrication parameters of a semiconductor equipment (not shown) in real-time. The gathering of large amounts of data points for each of the abovementioned fabrication parameters are referred as raw data points V2. The raw data points V2 show the change of each fabrication parameter value with respect to time that the end user intends to monitor. For example, please refer to FIG. 5B, which shows a plot of a time-varying parameter of a semiconductor equipment in a real case study. The horizontal axis indicates "time", which is the sampling period of a particular fabrication parameter (e.g. FDC parameter 2). For example, if the total time period is 2255 seconds, and the value of the fabrication parameter is recorded every second, then there will be 2255 cycles, with each cycle time being one second. In other words, 2255 raw data points 201 are collected and temporarily stored in the signal converter 11 for every fabrication parameter.

[Step S104, S106]

Please refer to FIGS. 1B and 3A~3C. As shown in FIGS. 3A~3C, the raw data points V2 vary periodically with waveform characteristics, therefore can be approximated based on its frequency. For the instant embodiment, the raw data points V2 are expressed in terms of the Fourier series V1 (step S104). The Fourier series V1 can be computed by the signal converter D11. Specifically, the Fourier series V1 can be obtained by the following steps: first, using the least squares method to obtain a trigonometric polynomial with the coefficients of $a_o$, $a_n$, and $b_n$. The trigonometric polynomial can be expressed by a periodic function $f(x)$ as follows:

$$f(x) = \frac{a_o}{2} + \sum_{n=-\infty}^{\infty} [a_n \cos(nx) + b_n \sin(nx)]$$

The above infinite summation is called the Fourier series of $f$, with x being the raw data points, while $a_o$, $a_n$, and $b_n$ are the Fourier coefficients.

Since the raw data points V2 can form a periodic waveform (not labeled), the method of compressing raw fabrication data of the instant disclosure uses linear combination of functions sin(nx) and cos(nx) of the Fourier series to approximate the periodic waveform. As shown in FIG. 3A, the smaller n is the smoother is the approximation, which is ideal for expressing smoother periodic function. As shown in FIG. 3C, as n increases more and more higher frequencies are added and the series V1 becomes closer to the square wave. In other words, the more sin(nx) terms that are included the more accurate the approximation. In FIG. 3A, the Fourier series is $f(x)=1.2698*\sin(x)$. In FIG. 3B, the Fourier series is $f(x)=1.2698*\sin(x)+0.4233*\sin(3x)$. For FIG. 3C, the Fourier series is $f(x)=1.2698*\sin(x)+0.4233*\sin(3x)+0.2539*\sin(5x)$. The coefficients 1.2698, 0.4233, and 0.2539 of the polynomial series are the Fourier coefficients.

Figure 1B:
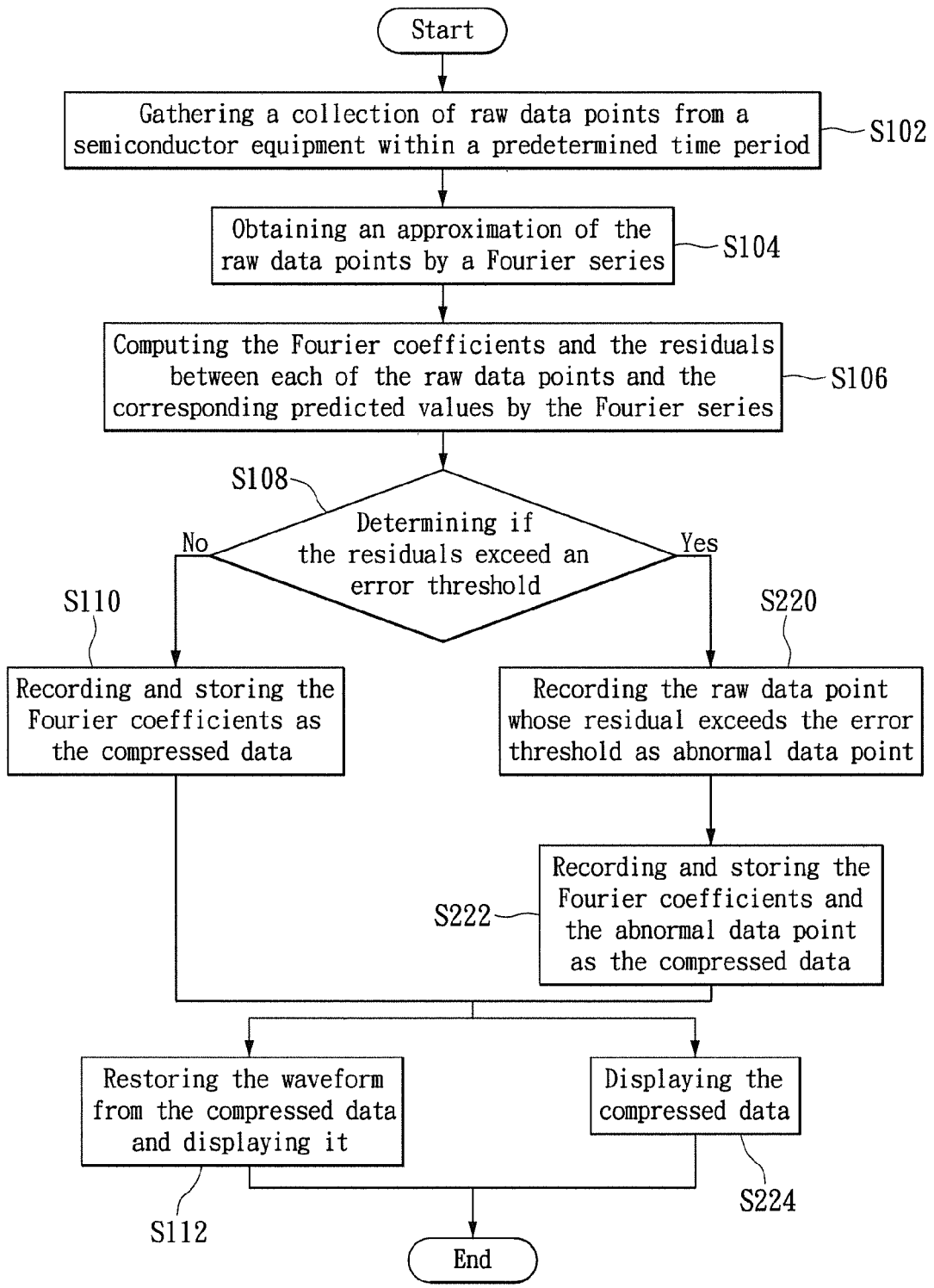
FIG. 1B is another flowchart showing the steps of the data compression method of the instant disclosure.

Please refer to FIGS. 1B and 4. In FIG. 4, the raw data points V2 are inspected against abnormality. In step S106, while the Fourier coefficients are being computed, the difference between every actual raw data point V2 and the closest predicted value by the Fourier series V1 are also being computed. This difference, also known as the residual (i.e., R1, R2), is computed by the residual analysis.

[Step S108]

Please refer back to FIGS. 1B and 4. After completing step S106, the residuals R1, R2 are checked if exceeding the error threshold T (step S108). The error threshold T is defined as the maximum peak-to-peak amplitude of the Fourier series V1.

[Step S110]

After completing the step S108, if none of the residuals between the raw data points V2 and the closest Fourier series V1 exceeds the error threshold T, the corresponding Fourier coefficients are then recorded as the compressed data and stored in the data storage device D12.

[Step S220, S222]

After completing the step S108, if the corresponding residual exceeds the error threshold T, the raw data point V2 would be detected by a signal detector D111, labeled as an abnormal data point U (step S220), and recorded by the data storage device D12. The abnormal data point U can alarm the end user to perform inspection or maintenance. Next, after step S220, the corresponding Fourier coefficients and abnormal data point U are recorded as compressed data and stored in the data storage device D12 (step S222).

However, if the data compression method of the instant disclosure approximates the raw data points V2 solely by adding more terms of sin(nx) using the Fourier series, the obtained compressed data points would just be the Fourier coefficients. Instead, the data compression method of the instant disclosure also uses the error threshold T to establish residual analysis, for identifying and storing abnormal data points U in the data storage device D12. Thereby, the compressed data points comprise the Fourier coefficients and the abnormal data points U. The abnormal data points U can be displayed for the user to record, monitor, and determine the status of each fabrication parameter. Moreover, the original waveform can be restored from the abnormal data points U of the compressed data with low distortion rate. More specifically, the compressed data points (Fourier coefficients and abnormal data points U) obtained by the data compression method of the instant disclosure can be decompressed to restore the original waveform. The restored waveform can accurately describe the pattern of the raw data points. Therefore, the applicability of the data compression method of the instant disclosure for modeling the fabrication parameters is further enhanced. The abovementioned visual display step (S112) and restoration step (S224) are described in later sections.

Please refer to FIGS. 1B, 2, and 5A~5G. FIG. 1B is another flowchart of the data compression method of the instant disclosure. This flowchart differs from the first flowchart by performing the step of S112 or S224 upon completing the step of S110 or S222.

[Step S112, S224]

Please refer back to FIGS. 1B, 2, and 5A~5G. After the compressed data points have been stored in step S110 or step S222, the user can select to implement either step S112 or S224. Step S112 includes a restoration step and a displaying step. The restoration step is done by a waveform restoration device D13 (as shown in FIG. 2) to decompress the compressed data points to restore the original waveform 10, 20, 30, 40, 50, 60, and 70 (FIGS. 5A~5G) of measure data for comparison with the raw data points 101, 201, 301, 401, 501, 601, and 701, respectively. The displaying step takes the original waveform and shows it on a displaying device D3 (FIG. 2). The user can simply observe the restored waveform to track the performance of the semiconductor equipment.

Meanwhile, step S224 also provides a visual display. However, step S224 differs from step S112 by directly displaying the compressed data stored in step S110 or S222 onto the displaying device D3 (as shown in FIG. 2). The user can read and analyze the compressed data (Fourier coefficients and abnormal data point U) to track and adjust the fabrication parameters of the semiconductor equipment.

Please note, for this embodiment, the steps S102, S104, S106, and S108 can be performed by the signal converter D11. The step S220 can be performed by the signal detector D111, while steps S110 and S222 can be carried out by the data storage device D12. The signal detector D111 is disposed within the signal converter D11.

The application of the method of compressing raw fabrication data of the instant disclosure for semiconductor equipment is described in details hereinbelow.

Figure 5A:
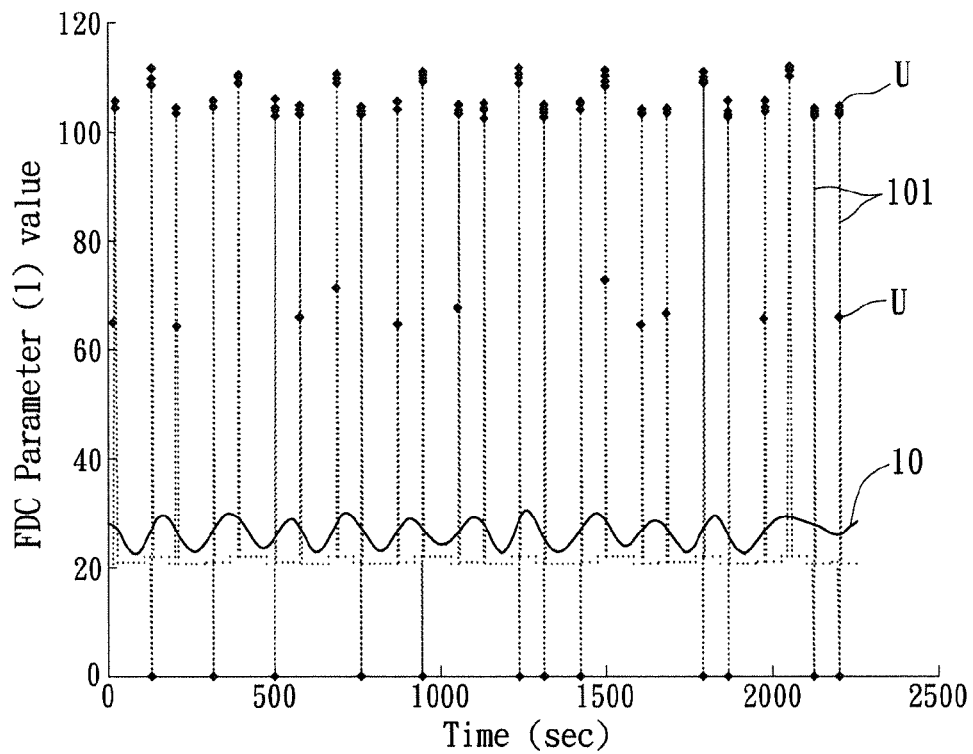
FIG. 5A is a plot showing the Fourier series for a first embodiment of the instant disclosure.
Figure 5B:
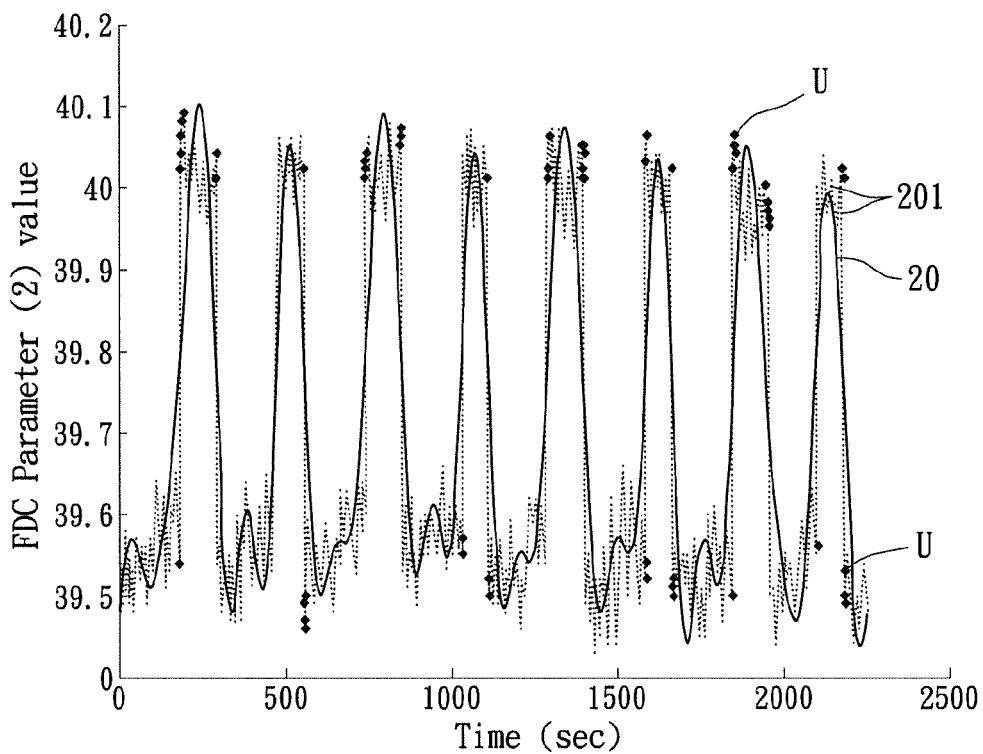
FIG. 5B is a plot showing the Fourier series for a second embodiment of the instant disclosure.
Figure 5C:
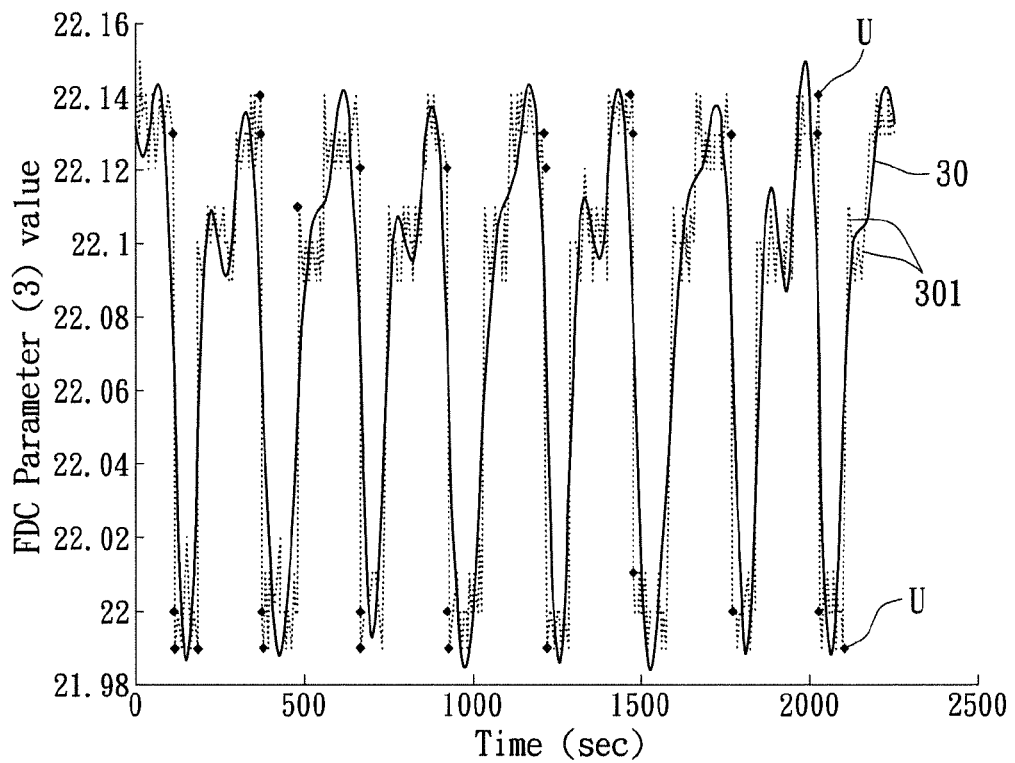
FIG. 5C is a plot showing the Fourier series for a third embodiment of the instant disclosure.
Figure 5D:
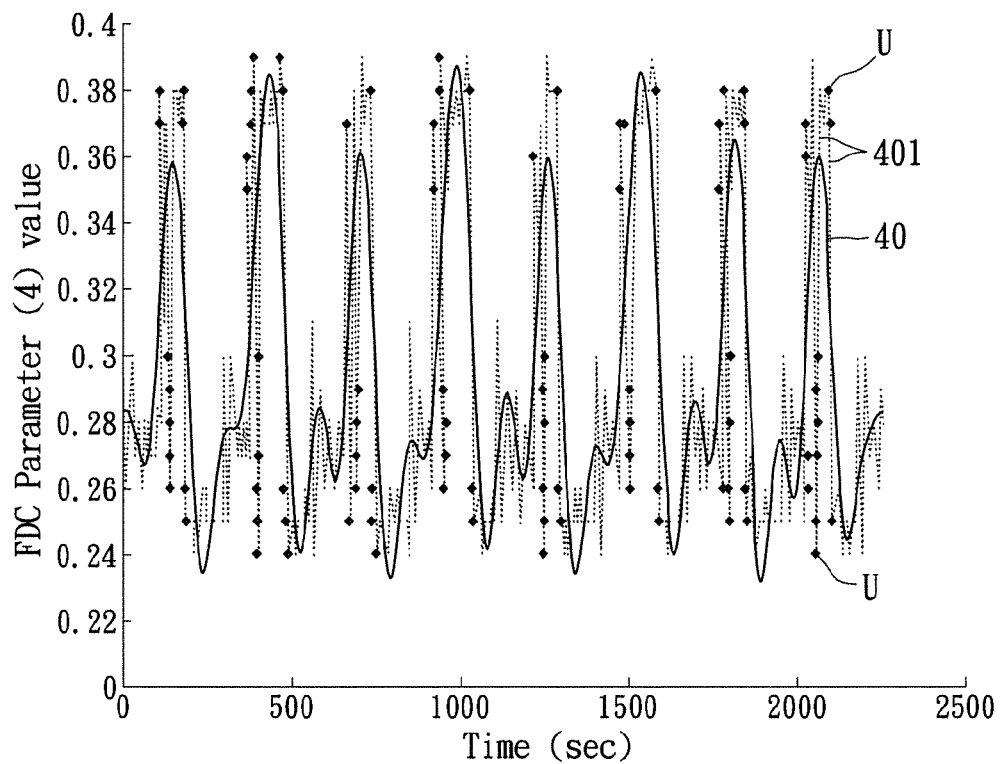
FIG. 5D is a plot showing the Fourier series for a fourth embodiment of the instant disclosure.
Figure 5E:
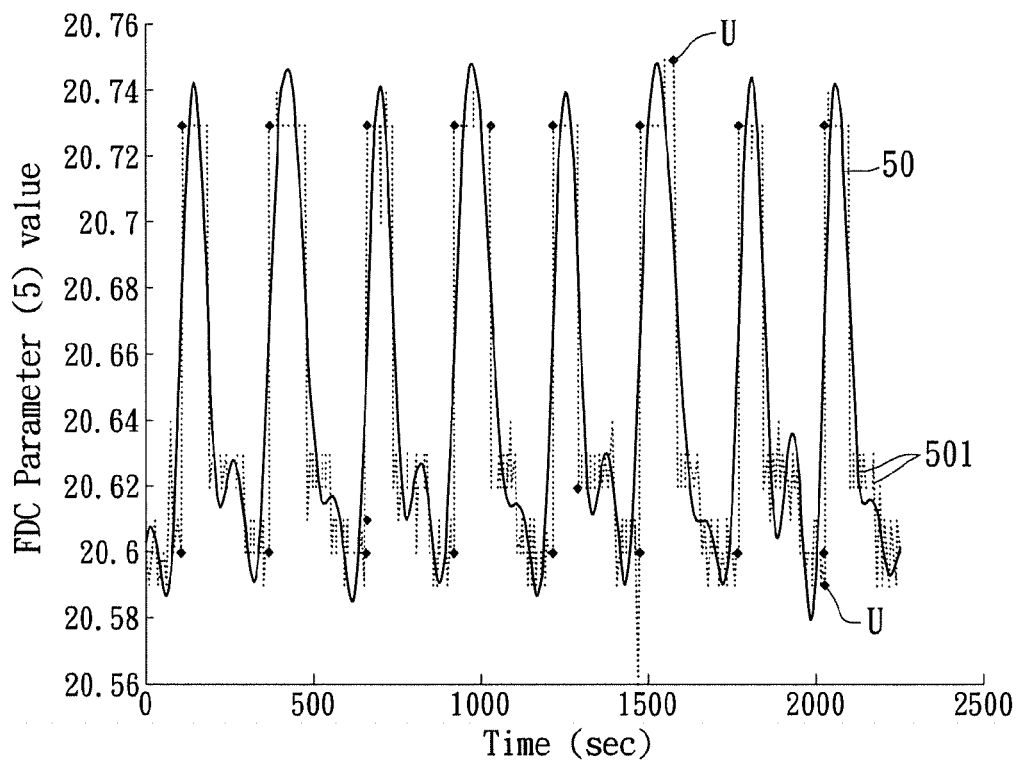
FIG. 5E is a plot showing the Fourier series for a fifth embodiment of the instant disclosure.
Figure 5F:
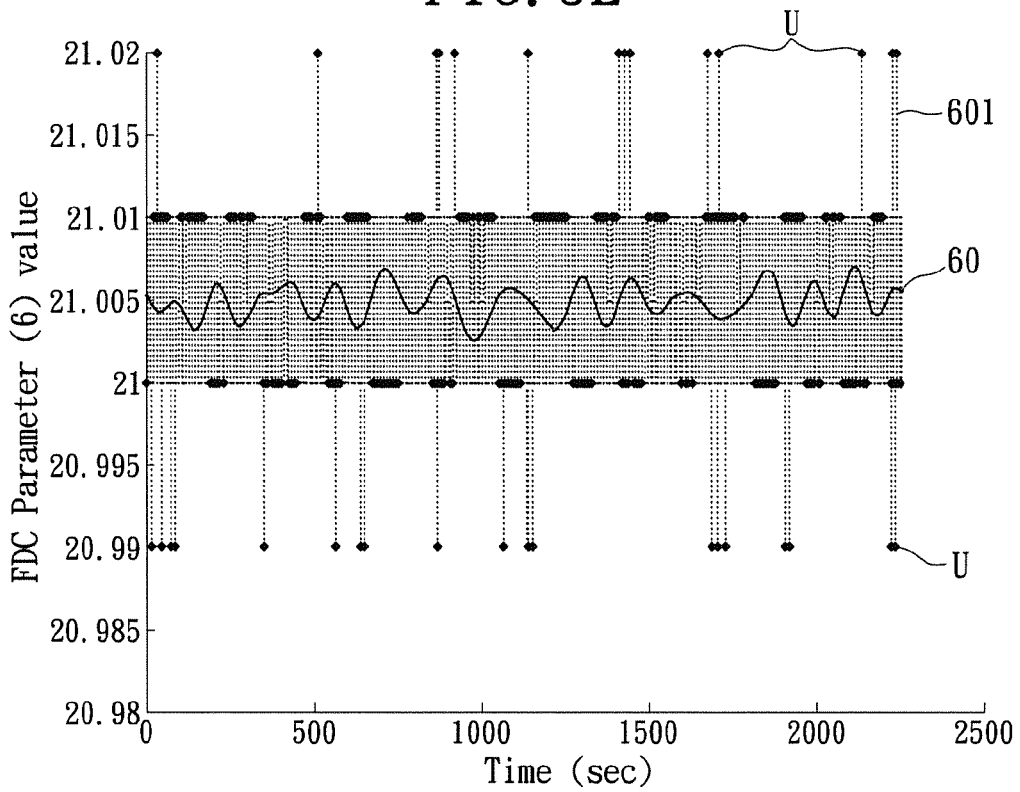
FIG. 5F is a plot showing the Fourier series for a sixth embodiment of the instant disclosure.
Figure 5G:
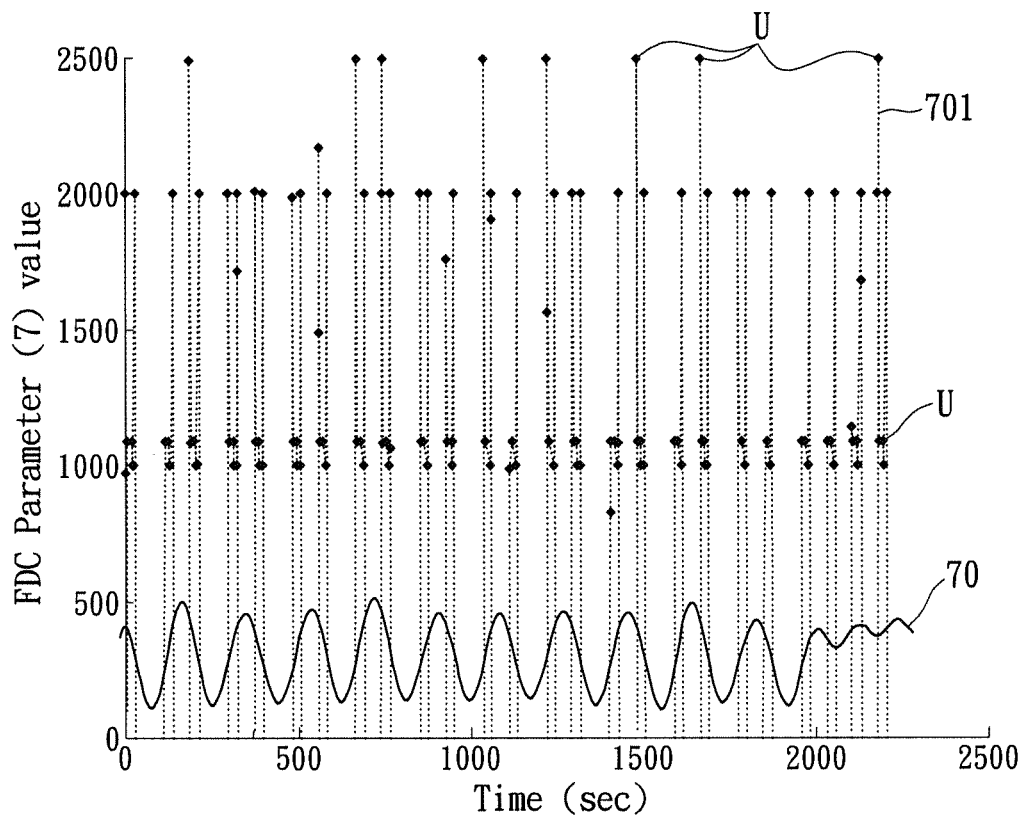
FIG. 5G is a plot showing the Fourier series for a seventh embodiment of the instant disclosure.

Please refer back to FIGS. 1B, 2, and 5A~5G. In particular, FIGS. 5A~5G show the first through fifth embodiment of using the data compression method of the instant disclosure. Each embodiment is illustrated by a plot comparing the restored waveform by the data compression method of the instant disclosure versus the actual raw data points. For explaining purpose, seven FDC parameters are arbitrarily selected by the signal converter D11, namely FDC parameter 1, FDC parameter 2, FDC parameter 3, FDC parameter 4, FDC parameter 5, FDC parameter 6, and FDC parameter 7 (step S102). The collected raw fabrication data points for the preceding parameters are labeled as 101, 201, 301, 401, 501, 601, and 701. The restored waveforms are labeled as 10, 20, 30, 40, 50, 60, and 70. These restored waveforms are obtained from the compressed data points by the data compression method of the instant disclosure. The descriptions below pertain to using the data compression method of the instant disclosure for compressing the raw fabrication data of the semiconductor equipment with high compression ratio and low distortion rate. Most of the raw fabrication data points of the FDC parameters detected by the FDC system D2 show some kind of periodic behavior (FIGS. 5B~5E), while very few lack such behavior (FIGS. 5A, 5F, and 5G). For example, as shown in FIGS. 5B~5E, the raw data points 201, 301, 401, and 501 of the FDC parameter 2, FDC parameter 3, FDC parameter 4, and FDC parameter 5 all reflect periodic behaviors, respectively. Thereby, the restored waveforms 20, 30, 40, and 50 can accurately predicts and describes the patterns of the FDC parameters (step S104). However, as shown in FIGS. 5A, 5F, and 5G, the FDC parameter 1, FDC parameter 6, and FDC parameter 7 that do not show any periodic behavior would have many abnormal data points U (For example, the raw fabrication data points of FDC parameter 1 and FDC parameter 7 totally do not reflect any periodic behavior, while the raw fabrication data points of FDC parameter 6 remain at a constant value for an extended period of time). The large amounts of abnormal data points U mean many recordings have to be done in step S220, which takes up more storage space. Under such condition, the data compression method of the instant disclosure would loose its effectiveness, and much distortion (see Table 1) would be introduced when trying to restore the original waveforms (step S112). Hence, the restored waveforms 10, 60, and 70 can not accurately approximate the patterns of the FDC parameter 1, FDC parameter 6, and FDC parameter 7, respectively. Thereby, the method of compressing raw fabrication data of the instant disclosure is good for using with FDC parameters having periodic behaviors, while is not suitable for using with few FDC parameters that do not have periodic behaviors.

Regarding to whether the data compression method of the instant disclosure is suitable for compressing raw fabrication data of the semiconductor equipment, an objective analysis is given in Table 1:

TABLE 1

| FDC Parameter | FDC 1 | FDC 2 | FDC 3 | FDC 4 | FDC 5 | FDC 6 | FDC 7 |
| --- | --- | --- | --- | --- | --- | --- | --- |
| Rsquare | 0.23 | 0.92 | 0.93 | 0.83 | 0.93 | 0.09 | 0.64 |
| Adj_Rsquare | 0.86 | 0.94 | 0.95 | 0.90 | 0.95 | 0.64 | 0.88 |

TABLE 1-continued

| FDC Parameter | FDC 1 | FDC 2 | FDC 3 | FDC 4 | FDC 5 | FDC 6 | FDC 7 |
|---|---|---|---|---|---|---|---|
| Mean_Raw | 26.2197 | 39.6948 | 22.0793 | 0.2922 | 20.648 | 21.0049 | 300.695 |
| Mean_Cmp | 26.2198 | 39.6948 | 22.0793 | 0.2922 | 20.648 | 21.0049 | 300.693 |
| Std_Raw | 20.2621 | 0.2174 | 0.0546 | 0.0495 | 0.0560 | 0.0053 | 523.763 |
| Std_Cmp | 9.6128 | 0.2090 | 0.0528 | 0.0452 | 0.0541 | 0.0016 | 418.871 |
| Space_Raw (double) | 2255 | 2255 | 2255 | 2255 | 2255 | 2255 | 2255 |
| Space_Cmp (double) | 368 | 155 | 151 | 216 | 148 | 819 | 293 |
| Transform Time (sec) | 3.43 | 2.85 | 3.46 | 3.07 | 3.46 | 2.82 | 3.19 |
| Compression rate | 0.8368 | 0.9313 | 0.9330 | 0.9042 | 0.9344 | 0.6368 | 0.8701 |

In Table 1, Mean_Raw refers to the average value of the raw data points of each FDC parameter, Mean_Cmp refers to the average value of the compressed data points of each FDC parameter, Std_Raw refers to the standard deviation of the raw data points for each FDC parameter, Std_Cmp represents the standard deviation of the compressed data points for each FDC parameter, Space_Raw represents the number of stored raw data points, Space_Cmp represents the number of stored compressed data points, the Transform Time represents the time it takes to convert the raw data points into compressed data points, and the Compression Rate represents the compression ratio. The compression ratio is defined as follows: 1−(Space_Cmp/Space_Raw), and the distortion rate is defined as: 1−Adjusted_Rsquare.

For the raw data points of the FDC parameters 2, 3, 4, and 5, which all exhibit periodic waveforms, Table 1 shows the compression of these raw data points by the data compression method of the instant disclosure all achieve high compression rates and low distortion rates. For example, in conjunction with FIG. 5C, the number of the raw data points 301 for parameter 3 is 2255, and the number of compressed data points (Fourier coefficients and abnormal points U) is 151. Therefore, the compression rate can reach 93.3%. Moreover, a comparison between the restored waveform 30 from the compressed data points against the pattern of the raw data points 301 shows a distortion rate of only 5% (1−Adjusted_R-square). However, for raw data points of the FDC parameters 1, 6, and 7 that do not exhibit periodic behaviors, the use of the data compression method of the instant disclosure can not achieve high compression rates and low distortion rates. For example, in conjunction with FIG. 5A, the number of raw data points 101 of the FDC parameter 1 is 2255, and the number of compressed data points after compression is 368. Therefore, the compression rate only reaches 83.68%. A comparison between restored waveform 10 from the compressed data points versus the pattern of raw data points 101 shows a distortion rate of up to 14%. Therefore, the data compression method of the instant disclosure is not suitable for compressing the raw data points of any FDC parameter that does not have periodic behavior.

If all seven FDC parameters are compared to FDC parameters 2, 3, 4, and 5 that have periodic behaviors, the results are shown in Table 2:

TABLE 2

| FDC parameter | compression rate | Decompress distortion rate |
|---|---|---|
| FDC parameter 1~FDC parameter 7 | 86.38% | 12.65% |
| FDC parameter 2, FDC parameter 3, FDC parameter 4, FDC parameter 5 | 92.57% | 6.69% |

Table 2 shows for the FDC parameter 1~FDC parameter 7, the average compression rate is 86.38% and the average distortion rate spikes to 12.56%. If eliminating the FDC parameter 1, the FDC parameter 6, and the FDC parameter 7 that do not have periodic behaviors, the average compression rate for the FDC parameter 2, the FDC parameter 3, the FDC parameter 4, and the FDC parameter 5 can increase to 92.57%, while the average distortion rate can be reduced to 6.69%.

Since the data compression method of the instant disclosure provides high compression ratio and low distortion rate, the user can take the compressed data points directly for extra processing, such as root cause analysis, etc. Therefore, the data compression method of the instant disclosure can be used broadly for other applications, making it full of practical and economic values.

The instant disclosure also provides a system D1 for compressing raw data from the semiconductor manufacturing equipment. The data compression system D1 comprises the signal converter D11, the data storage device D12, and the waveform restoration device D13. The signal converter D11 is used to gather a collection of raw data points from a semiconductor equipment within a given time period. The signal converter D11 also approximates these raw data points by Fourier series, along with computing the Fourier coefficients and the smallest residuals between the raw data points and respective values predicted by the Fourier series. Then, these residuals are checked if exceeding the error threshold T. The data storage device D12 is electrically connected to the signal converter D11, and is used to record and store the Fourier coefficients as compressed data points. The waveform restoration device D13 is electrically connected to the data storage device D12, and is used to restore the original waveform by using the compressed data points. The aforementioned raw data points are detected by the FDC system D2. As shown in FIG. 2, the raw data points collected by the FDC system D2 can first be fed to the data compression system D1. After the raw data points have been converted to compressed data points, the compressed data points are then exported to the displaying device D3. The displaying device D3 allows the user to track the status of the semi-conductor in real-time. If needed, the compressed data points would undergo extra processing and analysis. The aforementioned signal converter D11 further includes the signal detector D111, which is used to detect and record any raw data point that exceeds the error threshold as abnormal data point. The signal detector D111 is electrically connected to the signal converter D11. The aforementioned data storage device D12 may also be used to record and store the Fourier coefficients and abnormal data points as compressed data.

Based on the above descriptions, the data compression method of the instant disclosure has the following advantages. By using the Fourier series to approximate the raw data points, the raw data points are replaced by compressed data points. The replacement significantly reduces the required data storage space, while allowing the user to quickly download the data and speed up the processing time. Also, the user is able to do real-time monitoring over the fabrication parameters and make necessary adjustments, which save time and labor costs. Meanwhile, the method uses the least squares method to quickly compute the Fourier coefficients. Moreover, by defining the error threshold, residual analysis is used to establish a collection of abnormal data points, which can reduce the distortion rate of waveform restoration. By monitoring these abnormal data points, the user can record, track, and determine if any fabrication parameter is behaving abnormally.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. A method of compressing raw data representing an operational parameter of a semiconductor manufacturing equipment for fault determination, comprising the steps of:
   inputting into a signal convertor a collection of raw data points representing operational parameters of the semiconductor manufacturing equipment within a predetermined time period;
   obtaining an approximation of the raw data points with a Fourier series by the signal converter;
   computing the Fourier coefficients and the residuals between each of the raw data points and the corresponding predicted values by the Fourier series;
   determining if the residuals exceed an error threshold; and
   if none of the residual exceeds the error threshold, recording and storing in a data storage device the Fourier coefficients as the compressed data;
   if the corresponding residual exceeds the error threshold, recording in the data storage device the raw data point as abnormal data point before recording and storing the Fourier coefficients and the abnormal data point as the compressed data.

2. The method of compressing raw data representing an operational parameter of a semiconductor manufacturing equipment for fault determination of claim 1, wherein the raw data points are collected by a fault detection and classification (FDC) system.

3. The method of compressing raw data representing an operational parameter of a semiconductor manufacturing equipment for fault determination of claim 2, wherein the raw data points display periodic behavior.

4. The method of compressing raw data representing operational parameter of a semiconductor manufacturing equipment for fault determination of claim 1, wherein the signal converter uses the least squares method to compute the Fourier coefficients in obtaining a waveform function $f(x)$, wherein the waveform function $f(x)$ is defined as:

$$f(x) = \frac{a_o}{2} + \sum_{n=-\infty}^{\infty} [a_n\cos(nx) + b_n\sin(nx)],$$

wherein x is the raw data point with $a_n$, $a_n$, and $b_n$ being the Fourier coefficients.

5. The method of compressing raw data representing operational parameter of a semiconductor manufacturing equipment for fault determination of claim 1, wherein the recording process of the raw data point whose residual exceeds the error threshold as abnormal data point is performed by a signal detector disposed within the signal converter.

6. The method of compressing raw data representing operational parameter of a semiconductor manufacturing equipment for fault determination of claim 1, further comprising a restoration step and a displaying step, wherein the restoration step involves restoring an original waveform of measured raw data, and wherein the displaying step shows the restored waveform on a displaying device.

7. The method of compressing raw data representing operational parameter of a semiconductor manufacturing equipment for fault determination of claim 6, wherein the displaying step shows the compressed data points directly on the displaying device.

8. A system for compressing raw data from a semiconductor manufacturing equipment, comprising:
   a signal converter for gathering a collection of raw data points from the semiconductor manufacturing equipment within a predetermined time period, for approximating the raw data points by a Fourier series, for computing the Fourier coefficients and the residuals between the raw data points and the corresponding predicted values by the Fourier series, and for determining if any residual exceeds an error threshold;
   a data storage device electrically coupled to the signal converter, wherein the data storage device is used to record and store the Fourier coefficients as the compressed data;
   a waveform restoration device coupled electrically to the data storage device, wherein the waveform restoration device is used to restore the original waveform of the measured data from the compressed data.

9. The system for compressing raw data from a semiconductor manufacturing equipment of claim 8, wherein the signal converter includes a signal detector coupled electrically thereto, wherein the signal detector detects and records any raw data point, whose residual exceeds the error threshold, as an abnormal data point.

10. The system for compressing raw data from a semiconductor manufacturing equipment of claim 9, wherein the data storage device records and stores the Fourier coefficients and all abnormal data points as the compressed data.

* * * * *